Oct. 18, 1955  F. W. MELLBERG  2,720,815
MOUNTING MEANS FOR NONSPHERICAL ANAMORPHOSING OPTICAL SYSTEM
Filed Nov. 9, 1953
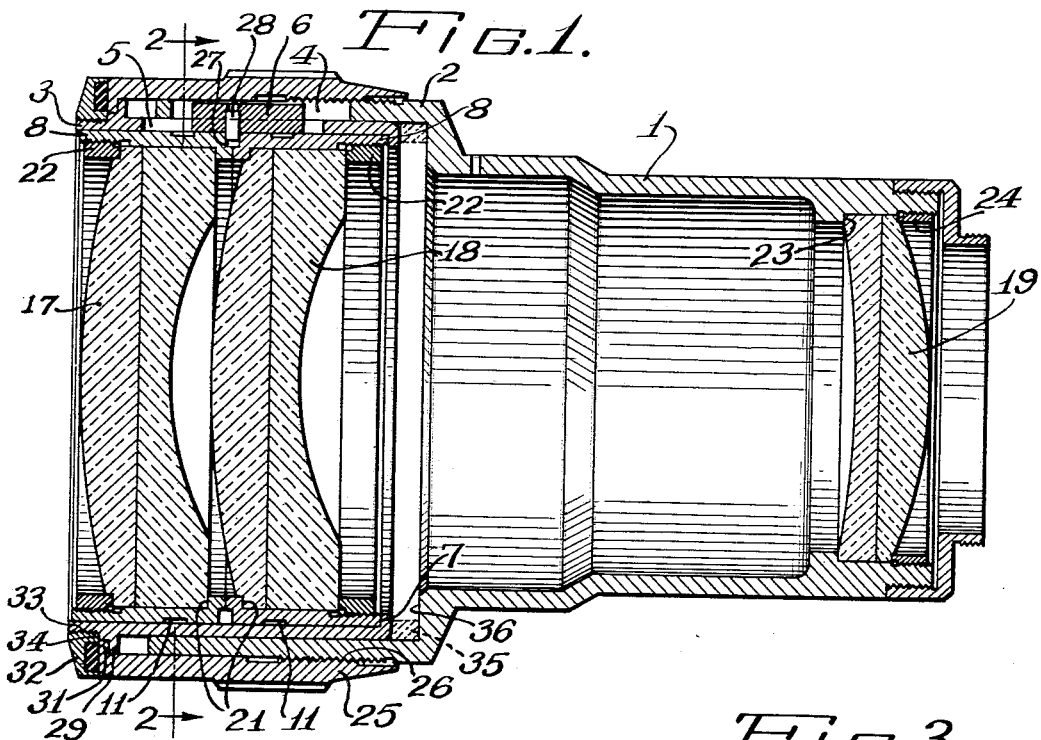
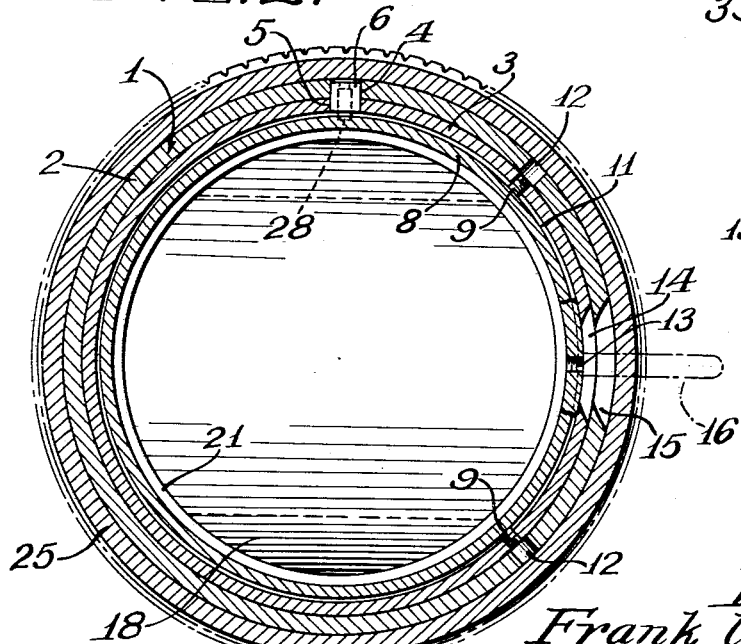
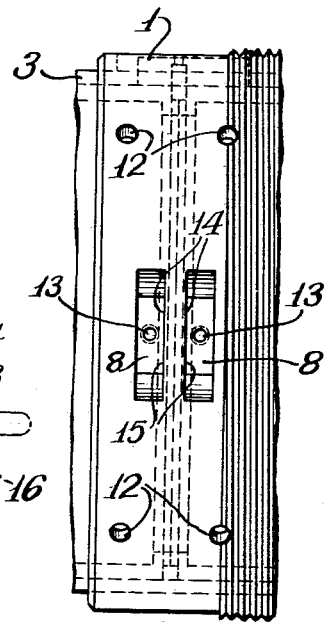
Inventor:
Frank W. Mellberg
By Robert F. Mehler, Atty.

United States Patent Office 2,720,815
Patented Oct. 18, 1955

2,720,815

MOUNTING MEANS FOR NONSPHERICAL ANAMORPHOSING OPTICAL SYSTEM

Frank W. Mellberg, Chicago, Ill., assignor to Bell & Howell Company, Chicago, Ill., a corporation of Illinois Application November 9, 1953, Serial No. 391,064

6 Claims. (Cl. 88—57)

My invention relates to a mount for an optical system comprising a plurality of axially spaced nonspherical components such as an anamorphosing system, and has for its objects the provision of a desirable and relatively simple and compact mount which is convenient in assembly and disassembly, which provides for convenient and precise relative angular orientation of the nonspherical components of the system mounted thereon, which provides for relative axial adjustment of the components of the system for focusing the same, and which when assembled does not expose any side openings of the mount structure for purposes of appearance and the exclusion of dirt.

The invention will be better understood by reference to the accompanying drawing forming a part hereof and in which—

Figure 1 is a sectional view of a mount embodying my invention and taken on an axial plane thereof and showing an anamorphosing optical system mounted therein;

Figure 2 is a sectional view of the same taken substantially on the line 2—2 of Figure 1 with one of the components of the optical system omitted; and Figure 3 is a partial side elevational view of parts of the mount.

Referring particularly to Figures 1 and 2 of the drawing, an elongated main or outer sleeve 1 is enlarged at one end portion thereof as designated at 2, and an intermediate sleeve 3 is engaged within this portion for axial movement with respect thereto. The outer sleeve portion 2 is provided with an elongated side opening 4 therethrough and extending axially thereof, and the intermediate sleeve is also provided with an elongated side opening 5 therethrough and extending axially thereof. A key 6 is slidably engaged in the outer sleeve opening 4 and is engaged in the intermediate sleeve opening 5 and is positioned as hereinafter described, so that the intermediate sleeve is angularly fixed with the outer sleeve and is axially movable with respect thereto.

The intermediate sleeve 3 is provided at its inner end with an internal annular axially facing shoulder 7, and two inner sleeves 8 are engaged within the intermediate sleeve for independent angular adjustment with respect thereto, and the inner and intermediate sleeves are secured in angularly adjusted relation with one of the inner sleeves axially abutting the intermediate sleeve shoulder 7 and the inner sleeves abutting each other, by means of set screws 9 screw threaded radially through the intermediate sleeve and engaged in circumferential grooves 11 on the peripheries of the inner sleeves and engaging inwardly against the inner sleeves. The outer sleeve 1 is provided with side openings 12 therethrough, see Figures 2 and 3, which provide access to the set screws 9 for securing the inner and intermediate sleeves together or releasing the same.

The inner sleeves 8 are provided at their peripheries with adjusting formations 13 in the form of screwthreaded side bores therethrough, and the intermediate and outer sleeves are provided with registering side openings therethrough, respectively designated at 14 and 15, providing access to the adjusting formations for angularly adjusting the inner sleeves with respect to the intermediate sleeve. Preferably this adjustment of each inner sleeve is conveniently accomplished with precision by means of a rod 16, indicated by dot and dash lines in Figure 2, extending through apertures 14 and 15 overlying the inner sleeve and screwthreaded into the bore 13 of the inner sleeve, the rod being removed after the adjustment has been made and the inner and intermediate sleeves secured in adjusted relation.

As shown, the mount is particularly adapted for the mounting therein of an anamorphosing optical system as described and claimed in the application for United States patent of Arthur Cox, Serial No. 384,606, filed October 7, 1953, for Anamorphosing Optical System, and comprising three axially spaced cylindrical (nonspherical) components, respectively designated at 17, 18 and 19 in Figure 1, and of which the components 17 and 18 are closely axially spaced and the components 18 and 19 are considerably axially spaced. The components 17 and 18 are fixedly mounted respectively within the inner sleeves 8 between internal annular axially facing shoulders 21 of these sleeves and clamp rings 22 screwthreaded into these sleeves, and the component 19 is similarly fixedly mounted within the outer sleeve 1 in the region of the end thereof opposite the enlarged end portion 2, between an internal annular axially facing shoulder 23 of the outer sleeve and a clamp ring 24 screw threaded in this sleeve.

An adjusting sleeve 25 surrounds the major portion of the outer sleeve end portion 2 and is rotatable with respect to the intermediate and outer sleeves. The adjusting sleeve is screwthreaded, as designated at 26 in Figure 1, on the outer sleeve end portion 2 in the region of the inner end thereof, so that relative rotation of the adjusting and outer sleeves effects relative axial movement thereof. The adjusting sleeve projects from the screwthread connection 26 outwardly beyond the outer sleeve end portion 2, and the side openings 4, 12 and 15 of the outer sleeve and the key 6 lie outwardly beyond the screwthread connection 26 between the adjusting and outer sleeves and normally underlie the adjusting sleeve, so that the side openings and key are concealed and dirt is excluded therefrom.

The key 6 is confined between the adjusting and outer sleeves, and the opposing ends of the inner sleeves 8 are circumferentially reduced to form an annular groove 27, see Figure 1, when these sleeves are assembled within the intermediate sleeve 3, and a pin 28 secured with the key engages in this groove to position the key axially of the intermediate sleeve.

The intermediate sleeve 3, see Figure 1, projects outwardly beyond the outer sleeve end portion 2 and is provided outwardly beyond the same with an external annular flange 29, and the adjusting sleeve 25 which also projects outwardly beyond the outer sleeve end portion 2, is provided with an internal annular flange 31 arranged outwardly of and axially engageable inwardly against the flange 29. A bearing ring 32 is screwthreaded, as designated at 33, on the intermediate sleeve 3 outwardly of the flanges 29 and 31, and being screwthreaded against an annular axially facing shoulder 34 on the intermediate sleeve, confines the flange 31 between it and the flange 29 and forms together with these flanges an annular axial bearing connection between the intermediate and adjusting sleeves arranged outwardly of the outer sleeve end portion 2, which bearing connection axially secures the intermediate and adjusting sleeves together and permits relative rotation thereof, so that it cooperates with the screwthread connection 26 between the adjusting and outer sleeve for relatively axially adjusting the intermediate and outer sleeves with rotation of the adjusting sleeve relative to the outer and intermediate sleeves to focus the optical system by adjusting the axial spacing between the components 18 and 19 of the system.

It is to be observed that the axial bearing 29—31—32 comprises parts secured together in assembly and that the screwthread connection 26 is engageable and disengageable by relative rotation of the adjusting and outer sleeves, so that convenient assembly and disassembly is provided, the adjusting sleeve being assembled on the outer sleeve and connected with the intermediate sleeve as the final assembly operation and being disconnected from the intermediate sleeve and disassembled from the outer sleeve as the first disassembly operation.

In the course of assembly, the component 19 of the optical system is assembled within the outer sleeve 1 and is secured therein in approximately oriented relation with the key engaging side opening 4 of the outer sleeve, and the components 17 and 18 of the optical system are assembled respectively within the inner sleeves 8 and secured therein in approximately oriented relation with the adjusting formations 13 of the inner sleeves, and then the components of the optical system are precisely oriented with respect to each other in the assembly of the mount, preferably in the following manner:

The inner sleeve 8 carrying the component 18, is assembled within the intermediate sleeve 3 in abutting relation with the intermediate sleeve shoulder 7 with the adjusting formation 13 of this inner sleeve underlying the side opening 14 of the intermediate sleeve and thus with this sleeve and component 18 approximately oriented with the key engaging side opening 5 of the intermediate sleeve, and with set screws 9 screwthreaded into the intermediate sleeve and engaged in the groove 11 of the inner sleeve but not engaged inwardly against the inner sleeve so tightly as to prevent relative angular adjustment of these sleeves.

The intermediate sleeve is then assembled within the outer sleeve portion 2 and axially positioned therein corresponding with the infinity focus of the optical system as by first temporarily inserting a spacing ring 35 of predetermined thickness, indicated by dot and dash lines in Figure 1, between the inner end of the intermediate sleeve and an annular axially facing shoulder 36 of the outer sleeve at the inner end of the outer sleeve end portion 2, and the key 6 is engaged in the side openings 4 and 5 of the outer and intermediate sleeves to relatively angularly orient the same, the side openings 12 of the outer sleeve registering with the set screws 9 in the intermediate sleeve when these sleeves are so oriented. Then the inner sleeve carrying the component 18 is angularly adjusted by means of the rod 16, as hereinbefore described, to precisely orient the components 18 and 19 in accordance with observation by means of an optical collimator, after which the screws 9 engaging this inner sleeve are tightened, through side openings 12 of the outer sleeve, inwardly against the inner sleeve to secure the component 18 as so oriented.

Thereafter, the inner sleeve 8 carrying the component 17, is assembled within the intermediate sleeve 3 in abutting relation with the other inner sleeve, and is angularly adjusted relative to the intermediate sleeve and secured therewith in the same manner to precisely orient the component 17 with the components 18 and 19, and the components having been so oriented, the rod 16 is removed, the intermediate sleeve is disassembled from the outer sleeve, the spacing ring 35 is removed, the intermediate sleeve is again assembled within the outer sleeve end 2 and the key 6 is again engaged in the side openings 4 and 5, and finally, the adjusting sleeve 25 is assembled on the outer sleeve 1 and the bearing ring 32 is assembled on the intermediate sleeve 3 to complete the assembly.

While I have thus described my invention, I do not wish to be limited to the precise details described, as changes may be readily made without departing from the spirit of my invention, but having thus described my invention, I claim as new and desire to secure by Letters Patent the following:

1. In a mount for an optical system comprising a plurality of axially spaced nonspherical components, the combination of an outer sleeve within which one of said components is fixed, an intermediate sleeve engaged within said outer sleeve for axial movement with respect thereto, means angularly fixing said outer and intermediate sleeves and permitting relative axial movement thereof, an inner sleeve engaged within said intermediate sleeve for angular adjustment with respect thereto and within which a second of said components is fixed, means for securing said inner and intermediate sleeves together in angularly adjusted relation comprising a set screw screwthreaded through said intermediate sleeve radially thereof and engaging inwardly against said inner sleeve, and said outer sleeve being provided with a side opening therethrough through which said set screw is accessible.

2. In a mount for an optical system comprising a plurality of axially spaced nonspherical components, the combination of an outer sleeve within which one of said components is fixed, an intermediate sleeve engaged within said outer sleeve in the region of one end of said outer sleeve for axial movement with respect thereto, means angularly fixing said sleeves and permitting relative axial movement thereof, an inner sleeve engaged within said intermediate sleeve for angular adjustment with respect thereto and within which a second of said components is fixed, means for securing said inner and intermediate sleeves in angularly adjusted relation, an adjusting sleeve surrounding said outer sleeve in the region of said outer sleeve end and rotatable with respect to said intermediate and outer sleeves, and connections between said adjusting sleeve and each of said intermediate and outer sleeves for relatively axially adjusting said intermediate and outer sleeves with said rotation of said adjusting sleeve.

3. In a mount for an optical system comprising a plurality of axially spaced nonspherical components, the combination of claim 2 and further characterized in that said securing means comprises a set screw screwthreaded through said intermediate sleeve and engaging inwardly against said inner sleeve, that said outer sleeve is provided with a side opening therethrough providing access to said set screw, that said opening underlies said adjusting sleeve, and that said connections comprise parts secured together in assembly and providing for assembly of said intermediate sleeve within said outer sleeve prior to assembly of said adjusting sleeve on said outer sleeve.

4. In a mount for an optical system comprising a plurality of axially spaced nonspherical components, the combination of an outer sleeve within which one of said components is fixed, an intermediate sleeve engaged within said outer sleeve in the region of one end of said outer sleeve for axial movement with respect thereto and provided with an internal annular axially facing shoulder, means angularly fixing said sleeves and permitting relative axial movement thereof, two inner sleeves engaged within said intermediate sleeve for independent angular adjustment with respect thereto and within each of which one of said components is fixed, means for securing said inner and intermediate sleeves in angularly adjusted relation with one of said inner sleeves axially abutting said shoulder and said inner sleeves abutting each other, an adjusting sleeve surrounding said outer sleeve in the region of said outer sleeve end and rotatable with respect to said intermediate and outer sleeves, a screwthread connection between said adjusting and outer sleeves, and an annular axial bearing connection between said adjusting and intermediate sleeves arranged outwardly of said outer sleeve end and cooperating with said screwthread connection for relatively axially adjusting said intermediate and outer sleeves with said rotation of said adjusting sleeve.

5. In a mount for an optical system comprising a plurality of axially spaced nonspherical components, the combination of claim 4 and further characterized in that said securing means comprises set screws screwthreaded through said intermediate sleeve and engaging inwardly against said inner sleeves, that said inner sleeves are provided with adjusting formations at their peripheries, that said outer sleeve is provided with side openings therethrough overlying said set screws for access thereto, that said intermediate and outer sleeves are provided with side openings therethrough providing access to said adjusting formations, that said openings underlie said adjusting sleeve, and that said axial bearing comprises parts secured together in assembly and providing for assembly of said intermediate sleeve within said outer sleeve prior to assembly of said adjusting sleeve on said outer sleeve.

6. In a mount for an optical system comprising a plurality of axially spaced nonspherical components, the combination of claim 5 and further characterized in that said means angularly fixing said intermediate and outer sleeves comprises a key angularly fixed with said intermediate sleeve and an elongated side opening through and extending axially of said outer sleeve and underlying said adjusting sleeve and in which said key is slidably engaged.

References Cited in the file of this patent

UNITED STATES PATENTS

| | | |
|---|---|---|
| 1,831,626 | Kruening | Nov. 10, 1931 |
| 1,945,951 | Newcomer | Feb. 6, 1934 |
| 1,962,892 | Chretien | June 12, 1934 |
| 2,008,991 | Nowack | July 23, 1935 |
| 2,026,724 | Wollensak | Jan. 7, 1936 |
| 2,263,024 | Wood | Nov. 18, 1941 |
| 2,428,399 | Timoney | Oct. 7, 1947 |
| 2,535,115 | Back et al. | Dec. 26, 1950 |